Figure 1:
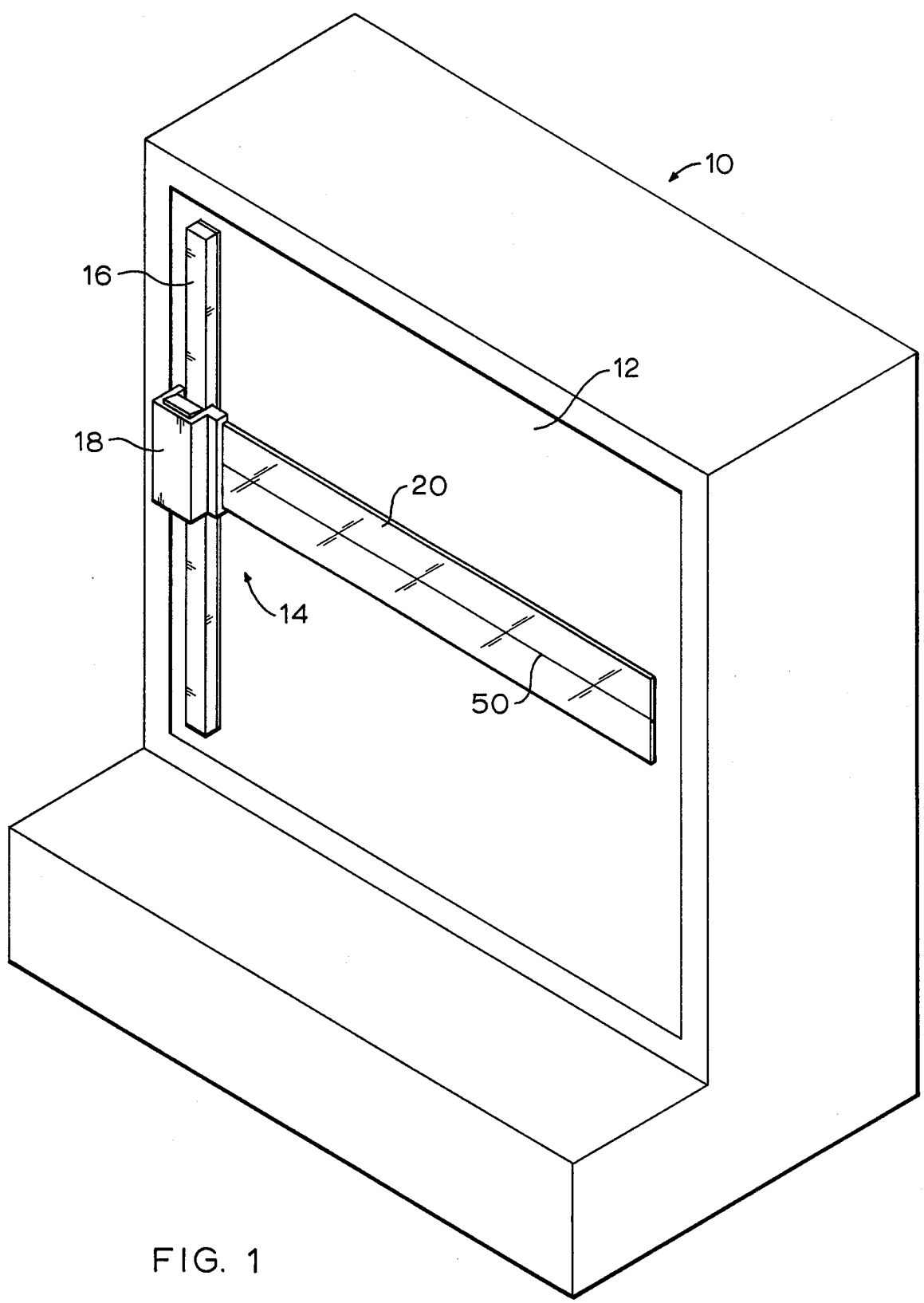

United States Patent [19]

Roth

[11] 4,102,050
[45] Jul. 25, 1978

[54] CURSOR ASSEMBLY

[76] Inventor: Ronald Arthur Roth, 274 Burton Avenue, Barrie, Ontario, Canada, L4N 2S2

[21] Appl. No.: 732,732

[22] Filed: Oct. 15, 1976

[51] Int. Cl.² .............................................. B43L 13/04
[52] U.S. Cl. ................................ 33/76 R; 33/DIG. 1
[58] Field of Search .............. 33/DIG. 1, 76 R, 75 R, 33/77

[56] References Cited

U.S. PATENT DOCUMENTS

| 3,393,456 | 7/1968 | Schrag | 33/75 R |
| 3,434,217 | 3/1969 | Abbott | 33/76 R |
| 3,868,777 | 3/1975 | Bell | 33/77 |

FOREIGN PATENT DOCUMENTS

| 1,206,363 | 4/1902 | France | 33/76 |

Primary Examiner—Charles E. Phillips
Attorney, Agent, or Firm—Fetherstonhaugh & Co.

[57] ABSTRACT

A cursor assembly for use in association with a viewing window of a microfiche viewer consisting of a first guide rail, a slide member and a reader bar projecting outwardly from the slide member. The slide member has U-shaped slipway extending longitudinally thereof. The slipway is substantially wider than the guide rail whereby the slide member may be located on the guide rail with the guide rail extending longitudinally through the slipway. A permanent magnet is carried by the slide member such that the slipway is located within the magnetic field of the magnet whereby the slide member may be magnetically secured with respect to the guide rail. The reader bar projects outwardly from the slide member and extends across the viewing window in use. The slipway and guide rail are proportioned to permit the slipway to be angularly inclined with respect to the guide rail to be angularly adjustable with respect to the guide rail to be aligned with images readable on the viewing window.

4 Claims, 8 Drawing Figures

CURSOR ASSEMBLY

FIELD OF INVENTION

This invention relates to a cursor assembly for use in association with a viewing window of a microfiche viewer or the like.

PRIOR ART

Various attempts have been made to use cursor assemblies to facilitate reading across a line of an image appearing at a viewing window of a microfiche reader or the like. In attempting to use the known reader bars difficulty has been experienced because of the fact that the image which extends across the window of the reader is frequently angularly inclined with respect to the transverse plane of the window. Various attempts have been made to provide a reader bar which is angularly adjustable. These prior structures have generally employed a mechanical locking or clamping device which must be secured or released to permit adjustment of the reader bar in use.

SUMMARY OF INVENTION

The present invention overcomes the difficulties of the prior art described above by providing a cursor assembly which includes a slide member and a reader bar mounted thereon and in which the slide member is magnetically attracted to a guide rail. The slide member has a U-shaped channel adapted to receive the guide rail so that the slide member may slide longitudinally along the guide rail in a controlled manner. The U-shaped channel is wider than the guide rail to permit angular movement of the reader bar with respect to the guide rail.

According to one aspect of the present invention a cursor assembly for use in a viewing window for microfiche viewer or the like consists of a ferrous guide rail adapted to be secured to a surface of a viewing window of a reader, a slide member having a U-shaped slipway extending longitudinally thereof, said slipway being substantially wider than said guide rail whereby said slide member may be located on said guide rail with said guide rail extending through said slipway, a permanent magnet carried by said slide member, said slipway being located within the magnetic field of said magnet whereby said slide member may be magnetically secured with respect to a guide rail extending through said slipway, a reader bar projecting outwardly from said slide member to extend across a viewing window in use, said slipway and guide rail being proportioned to permit said slipway to be angularly inclined with respect to said guide rail whereby the reader bar may be angularly adjusted with respect to said guide rail to be aligned with images readable at said viewing window.

According to a further aspect of the present invention the side walls of the U-shaped slipway are formed from a ferrous material and are magnetized so as to be magnetically attracted to said guide rail to assist in magnetically securing the reader bar in one or other of three positions namely, a first position extending perpendicular to the guide rail, second position angularly inclined upwardly and a third position angularly inclined downwardly with respect to the reader bar.

PREFERRED EMBODIMENT

Figure 2:
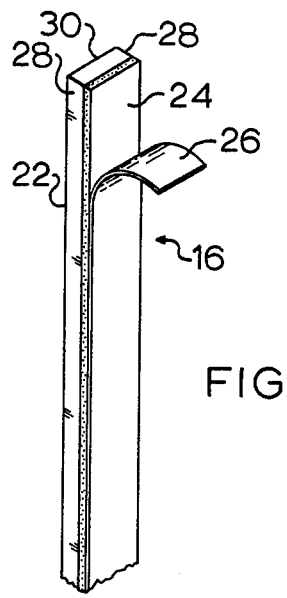
Figure 3:
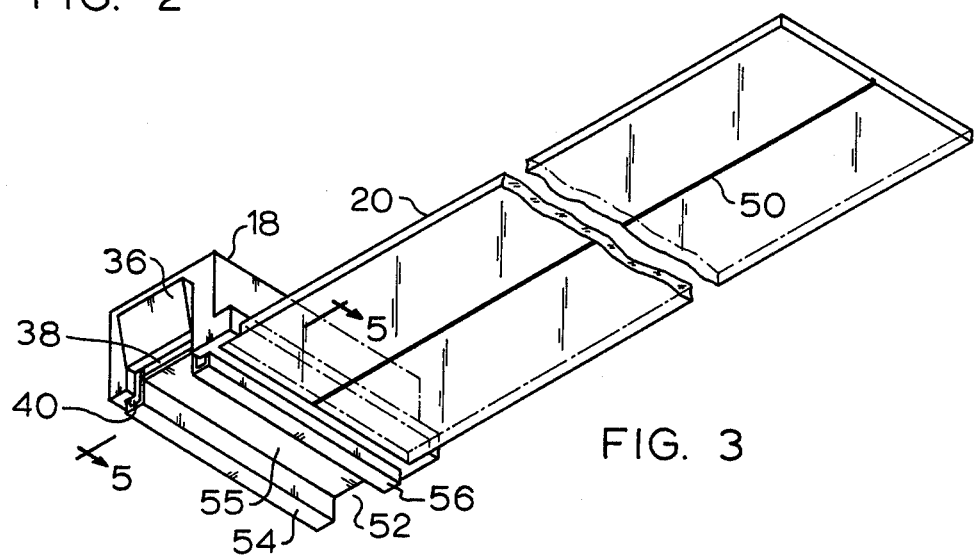
Figure 4:
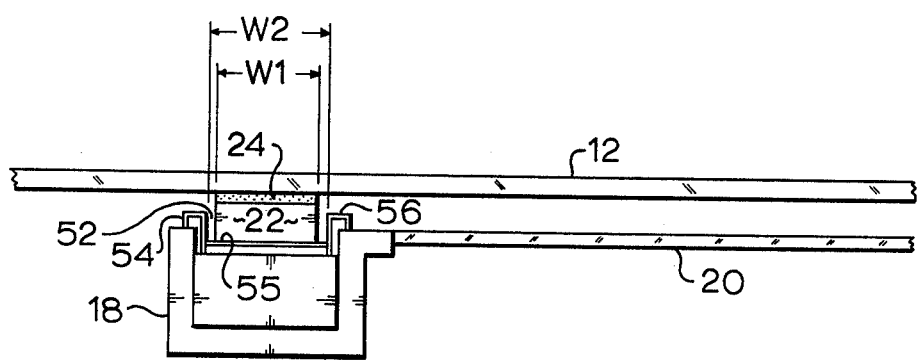
Figure 5:
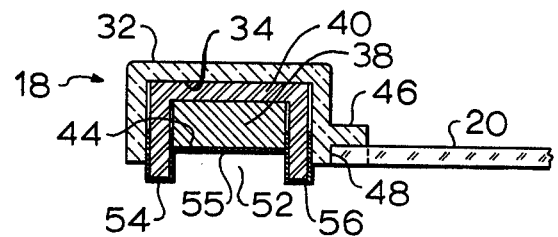

The invention will be more clearly understood after reference to the following detailed specification read in conjunction with the drawing wherein;

FIG. 1 is a diagramatic pictorial view of a microfiche reader with a cursor assembly mounted thereon, FIG. 2 is a pictorial view of a portion of a guide rail, FIG. 3 is a pictorial view of the underside of a slide member and reader bar according to an embodiment of the present invention, FIG. 4 is an end view of a cursor assembly mounted on a viewing window of a microfiche reader, FIG. 5 is a sectional view along the line 5-5 of FIG. 3, and FIGS. 6a, 6b, and 6c are diagramatic illustrations of the three positions which the cursor assembly may assume in use.

With reference to the drawings, in FIG. 1 of the drawings the reference numeral 10 refers generally to a microfiche viewer. The microfiche viewer has a viewing window 12 upon which a cursor assembly, generally identified by the reference numeral 14, is located. The cursor assembly consists of a guide rail 16, a slide member 18, and a reader bar 20.

As shown in FIG. 2 of the drawings, the guide rail 16 consists of an elongated rectangular shaped ferrous rod 22 which has a resilient adhesive pad 24 located on one face thereof. A detachable release sheet 26 is normally located on the adhesively coated outer surface of the resilient pad 24 during shipping and transportation of the guide rail. The release sheet is removed to expose the pressure sensitive adhesive surface of the pad prior to attachment of the guide rail to the window 12. The resilience of the resilient pad 24 serves to accommodate thermal expansion of the window 12 relative to the guide rail 16 in use. The guide rail 22 has a pair of oppositely disposed side faces 28 and a front face 30 which serve to guide the slide member 18 as it moves along the guide rail.

As shown in FIGS. 3, 4 and 5 of the drawings, the slide member 18 consists of a plastic housing 32 which has a rectangular shaped recess or chamber 34 extending inwardly from the inner face thereof. The ends of the chamber 24 are closed by a pair of oppositely disposed end walls 36. A U-shaped ferrous metal insert 40 is located within the rectangular shaped chamber 34. A permanent magnet 38 is located within the U-shaped ferrous metal insert 40 and serves to magnetize the insert 40. The magnet 38 has an outer face 44 spaced inwardly from the outer edges of the U-shaped ferrous metal insert in the edges of the plastic housing 32 to form a U-shaped slipway 52 extending longitudinally of the slide member 18. Low friction plastic liners 54 and 56 extend around the edges of the ferrous metal insert 40 and provide a low friction coating at the side walls of the slipway 52. A low friction plastic liner 55 is located on the outer face 44 of the magnet so that the entire surface of the slipway 52 is a low friction surface. The low friction plastic coating which is located within the slipway 52 serves to permit the slide member 18 to move smoothly along the guide rail 16 in use.

The slide member 18 also has a shoulder portion 46 projecting outwardly from one longitudinal side edge thereof, a channel shaped recess 48 is formed at the underside of the shoulder 46 and one end of the reader bar 20 is located in the recess 48. As shown in FIG. 3 of the drawings the reader bar 20 consists of a longitudinally elongated rectangular shaped transparent bar of plastics material. The reader bar has a line marking 50 extending longitudinally thereof.

With reference to FIG. 4 of the drawings, it will be seen that the U-shaped slipway 52 has a width W2 which is greater than the width W1 of the guide rail 16. Preferably the clearance between the guide rail 16 and the walls of the U-shaped slipway is sufficient to permit the reader bar to be angularly inclined at an angle $\theta$ (FIG. 6a) of about 5° to the transverse plane 60. It has been found that a suitable cursor assembly may have a slipway measuring about 1.625 inches in length and having a width W2 of about 0.375 inch to provide a clearance of about 0.065 inch between the guide rail which measures 0.310 inch and the side walls of the U-shaped slipway.

Figure 6A:
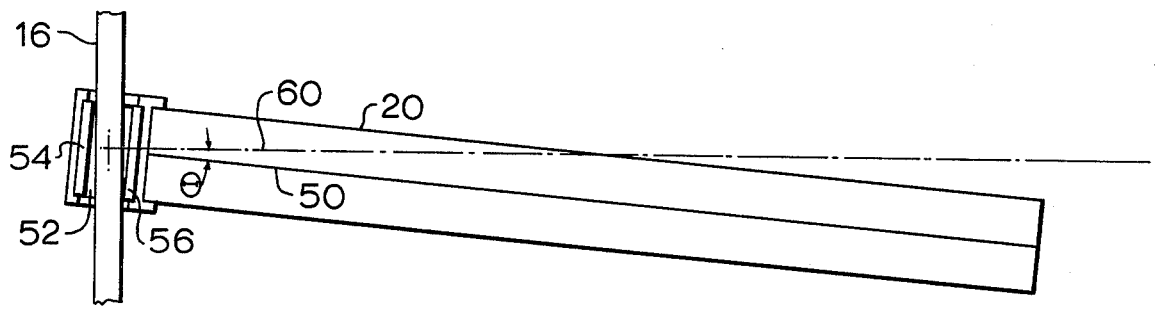
Figure 6B:
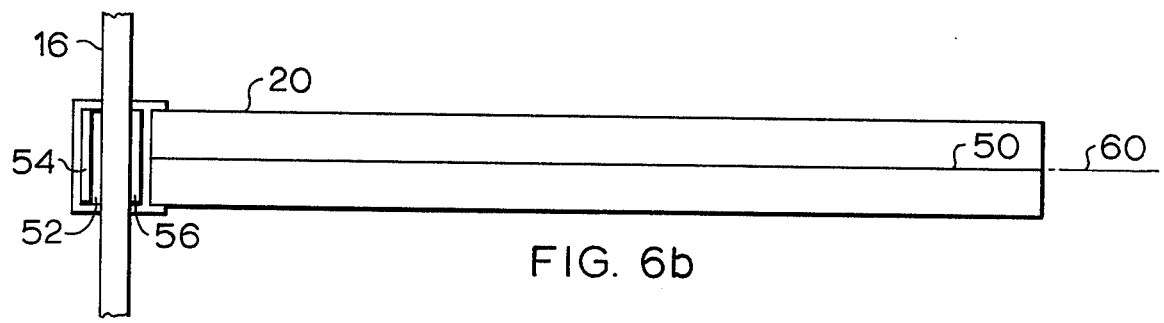
Figure 6C:
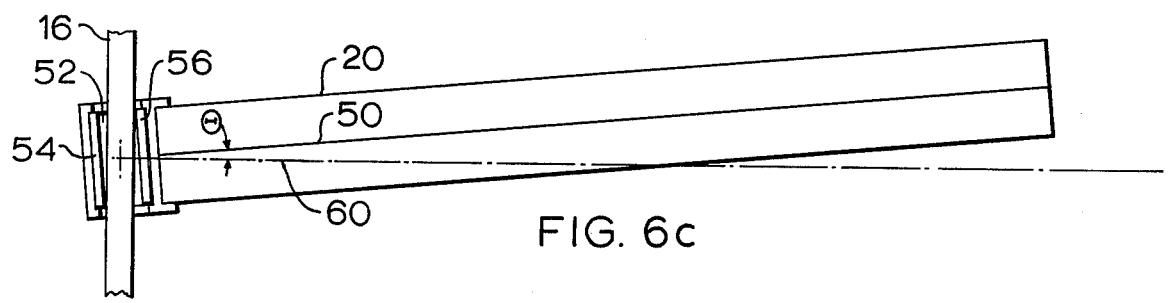

As shown in FIGS. 6a, 6b and 6c of the drawings, the reader bar may be located at any one of three positions relative to the guide rail. In the position shown in FIG. 6b of the drawings the line marking 50 of the reader bar 20 extends transversely across the window substantially at right angles to the guide rail 16. When the reader bar is in this position one side wall of the U-shaped channel 52 extends in intimate contact with the guide rail 16 while the other side wall of the U-shaped channel is spaced from the guide rail 16. When the reader bar is located in the position shown in FIG. 6a of the drawings wherein the line marking 50 is angularly inclined downwardly the slipway 52 is angularly inclined with respect to the guide rail 16 so that opposite ends of the oppositely disposed side walls of the slipway contact the guide rail 16. Similarly, when the reader bar is located in a position shown in FIG. 6c of the drawings opposite ends of the side walls of the slipway 52 engage the guide rail 16. As previously indicated the side walls of the slipway are magnetized and the engagement of the side walls with the guide rails together with the engagement of the guide rail by the magnet 38 serves to secure the reader bar in each of the three positions illustrated in FIGS. 6a, 6b and 6c of the drawings.

It will be apparent that in use the slide member may be manually engaged and moved longitudinally of the guide rail by overcoming the magnetic attraction between the slide member and the guide rail. The plastic coating within the slipway permits the slide member to move smoothly along the guide rail. The magnetic attraction between the guide rail and the slide member permits the reader bar to be located in either of the three positions described above without the need for any mechanical locking mechanism whereby adjustment and relocation of the reader bar may be very easily achieved.

From the aforegoing it will be apparent that the present invention provides a simple and inexpensive cursor assembly for use in association with a viewing window of a microfiche reader or the like which is angularly adjustable without the aid of any locking mechanism to be alignable with transverse images readable on the viewing window.

What I claim as my invention is:

1. A cursor assembly for use on a viewing window of a microfiche viewer or the like comprising:
   (a) a ferrous guide rail adapted to be secured to a surface of a viewing window of a reader,
   (b) a slide member having a slipway recess extending longitudinally thereof, said slide member being mounted on said guide rail with said guide rail extending longitudinally through said slipway to guide said slide member along said guide rail,
   (c) a permanent magnet carried by said slide member, said slipway being located within the magnetic field of said magnet whereby said slide member may be magnetically secured with respect to a guide rail extending through said slipway,
   (d) a reader bar projecting outwardly from said slide member to extend across a viewing window in use,
   (e) said slipway being wider than said guide rail to permit said slipway to be angularly inclined with respect to said guide rail to be angularly adjustable with respect to said guide rail to be aligned with images readable at said viewing window,
   (f) said slipway recess is U-shaped and has a pair of oppositely disposed side walls formed from a ferrous material which is magnetized by said permanent magnet whereby each of said side walls of said slipway recess is magnetically attracted to said guide rail such that when one or other of the side walls of the U-shaped slipway recess engages said guide rail said reader bar will extend at right engles to said guide rail and when said slipway is angularly inclined with respect to said guide rail opposite ends of said side walls will be magnetically secured to said guide rail to secure the reader bar in an angularly inclined position with respect to said guide rail.

2. A cursor assembly as claimed in claim 1, including low friction plastic liner means lining said U-shaped slipway whereby said slide member may be moved smoothly along said guide rail.

3. A cursor assembly as claimed in claim 1, wherein said slipway is sufficiently wider than said guide rail to permit said reader bar to be angularly inclined at an angle of about 5° to a plane extending perpendicularly from said guide rail.

4. A cursor assembly for use on a viewing window of a microfiche reader or the like comprising:
   (a) a guide rail consisting of a longitudinally elongated ferrous member having a front face, a back face and a pair of oppositely disposed side faces,
   (b) resilient adhesive means on said back face of said guide rail for adhesively securing said rail to a window of a reader or the like,
   (c) a slide member having an inner face, a recess formed in said inner face,
   (d) a U-shaped ferrous insert mounted in said recess of said slide member and opening outwardly therefrom, said U-shaped ferrous insert having a pair of oppositely disposed side walls having their outer edges disposed adjacent said inner face of said slide member and extending longitudinally of said recess,
   (e) a permanent magnet mounted in said U-shaped ferrous insert, said permanent magnet having an outer face spaced inwardly from said outer edges of said insert and cooperating with said side walls of said insert to form a U-shaped slipway extending longitudinally of said slide member,
   (f) low friction plastic liner means on said outer face of said insert and on the portions of said side walls of said insert which are located in said U-shaped slipway,
   (g) said U-shaped slipway being disposed within the magnetic field of said magnet and said side walls of said ferrous insert being magnetized whereby said slide member may be magnetically secured with respect to said guide rail at said inner face of said U-shaped channel and at each side wall of said U-shaped channel when said guide rail is located within said slipway,
(h) a reader bar projecting outwardly from said slide member substantially normal to said slipway,
(i) said slipway being substantially wider than said guide rail whereby said slipway and thus said reader bar may be angularly inclined with respect to said guide rail or may extend normal to said guide rail to be aligned with images readable on said window.

* * * * *